United States Patent [19]

Kakinuma et al.

[11] Patent Number: 5,983,097

[45] Date of Patent: Nov. 9, 1999

[54] MOBILE COMMUNICATION SCHEME FOR EFFICIENTLY REGULATING SERVICE THROUGH MICRO-CELL SYSTEM IN COORDINATION WITH SERVICE THROUGH MACRO-CELL SYSTEM

[75] Inventors: Kazuhiko Kakinuma, Yokohama; Masaaki Yoshimi, Fujisawa; Tatsuaki Wakabayashi; Kiyohito Nagata, both of Yokohama, all of Japan

[73] Assignee: NTT Mobile Communications Network Inc., Tokyo, Japan

[21] Appl. No.: 08/942,674

[22] Filed: Oct. 2, 1997

[30] Foreign Application Priority Data

Oct. 4, 1996 [JP] Japan .................................. P8-264735

[51] Int. Cl.$^6$ ...................................................... H04Q 7/00
[52] U.S. Cl. ........................... 455/422; 455/458; 455/435
[58] Field of Search ..................................... 455/422, 426, 455/431, 433, 434, 435, 436, 442, 444, 450, 458, 456, 550, 575, FOR 101

[56] References Cited

U.S. PATENT DOCUMENTS 5,574,971  11/1996  Aihara ...................................... 455/444
5,857,154  1/1999  Laborde et al. .......................... 455/444
5,903,834  5/1999  Wallstedt et al. ........................ 455/422

*Primary Examiner*—Thanh Cong Le
*Attorney, Agent, or Firm*—Oblon, Spivak, McClelland, Maier & Neustadt, P.C.

[57] ABSTRACT

A mobile communication scheme capable of notifying a communication regulation information efficiently by using radio interfaces from the macro-cell system to the micro-cell system, without requiring communications through a fixed communication network, so as to be able to regulate the service through the micro-cell system efficiently in coordination with the regulation of the service through the macro-cell system. In this mobile communication scheme, the communication regulation information is notified from the macro-cell system to the mobile station while the mobile station is located within the macro-cell system, and stored in a memory of the mobile station. Then, the communication regulation information is notified from the mobile station to the micro-cell system while the mobile station is located within the micro-cell system after moving from the macro-cell system to the micro-cell system, so that the communication regulation is applied to the mobile station at the micro-cell system according to the received communication regulation information.

24 Claims, 14 Drawing Sheets

FIG.2A
FIG.2B
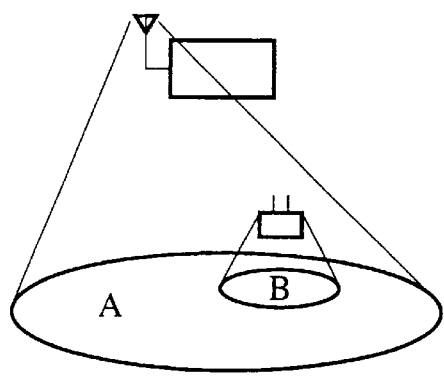
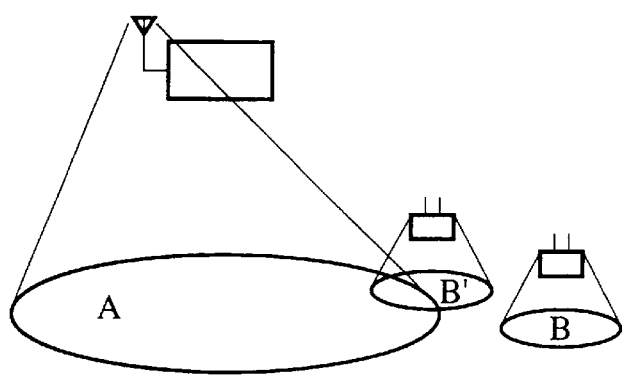

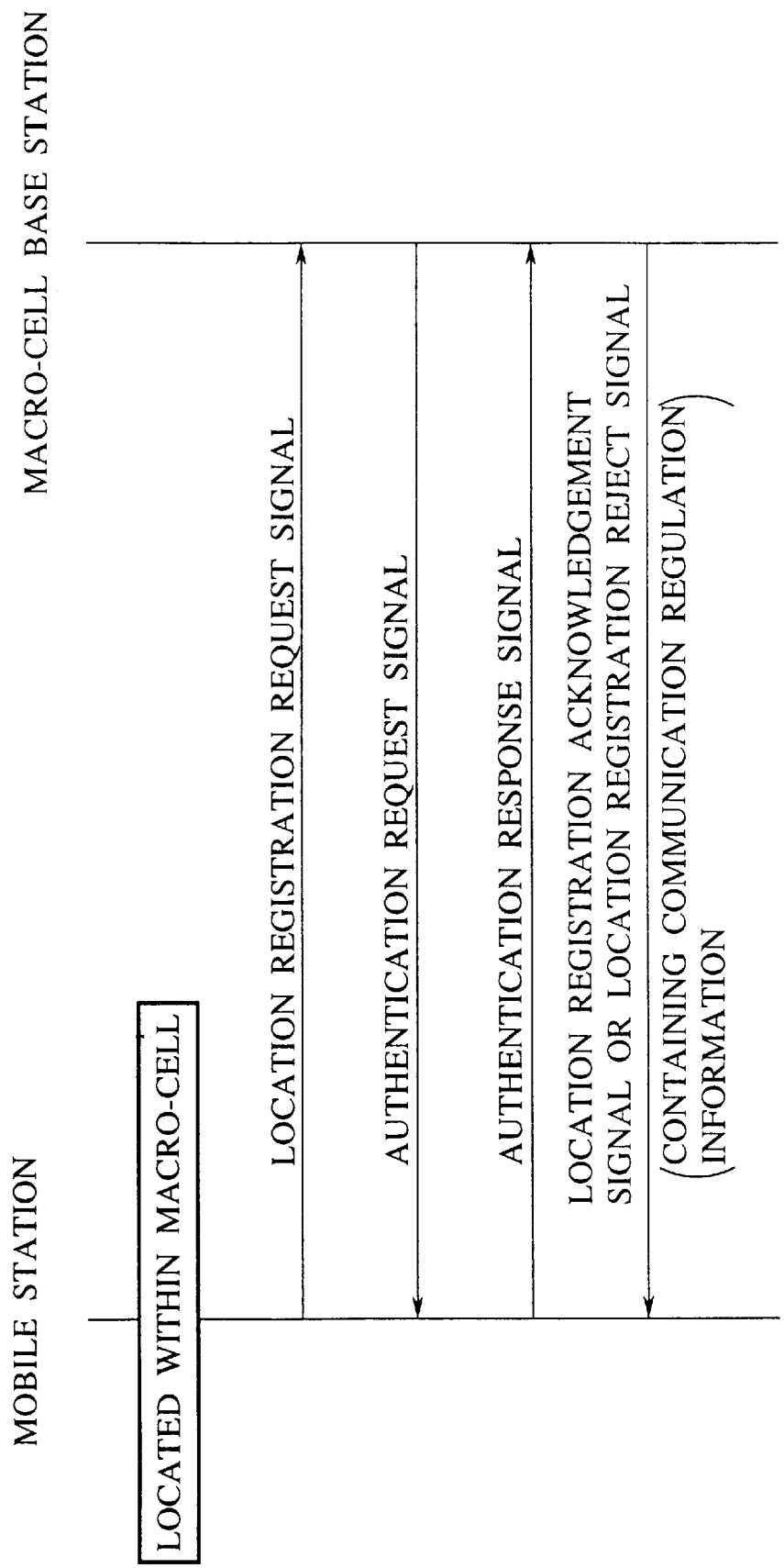

FIG.4

MESSAGE TYPE :LOCATION REGISTRATION ACKNOWLEDGEMENT
DIRECTION :NETWORK ⟶ USER(SCCH)

| INFORMATION ELEMENT | DIRECTION | CLASS | INFORMATION LENGTH | CONTENT |
|---|---|---|---|---|
| MESSAGE TYPE | DOWNLINK | M | 1 | 00100010 |
| DISPLAY | DOWNLINK | M | 1~33 | 00000000 |
| COMMUNICATION REGULATION INFORMATION NOTICE | DOWNLINK | O | 1 | 000000XX(NOTE) |

(NOTE) 2ND OCTET OF EXTENDED INFORMATION ELEMENT(000000XX)

X X
—
0 0 : COMMUNICATION REGULATION ABSENT
 (REGULATION REMOVED)
1 0 : COMMUNICATION REGULATION PRESENT
 (TEMPORAL SERVICE PROHIBITION)
1 1 : COMMUNICATION REGULATION PRESENT
 (PERMANENT SERVICE PROHIBITION)

M: MANDATORY
O: OPTIONAL

FIG.5

MESSAGE TYPE :LOCATION REGISTRATION REJECT
DIRECTION       :NETWORK ⟶ USER(SCCH)

| INFORMATION ELEMENT | DIRECTION | CLASS | INFORMATION LENGTH | CONTENT |
|---|---|---|---|---|
| MESSAGE TYPE | DOWNLINK | M | 1 | 00100011 |
| CAUSE | DOWNLINK | M | 1 | (NOTE) |

(NOTE) MM (MOBILE MANAGEMENT) CAUSE

BIT  8  7  6  5  4  3  2  1    CAUSE 0  0  0  0  1  1  0  1  :COMMUNICATION REGULATION PRESENT
                       (TEMPORAL SERVICE PROHIBITION)

0  0  0  0  1  1  1  0  :COMMUNICATION REGULATION PRESENT
                       (PERMANENT SERVICE PROHIBITION)

OTHERS                   :COMMUNICATION REGULATION ABSENT
                       (REGULATION REMOVED)

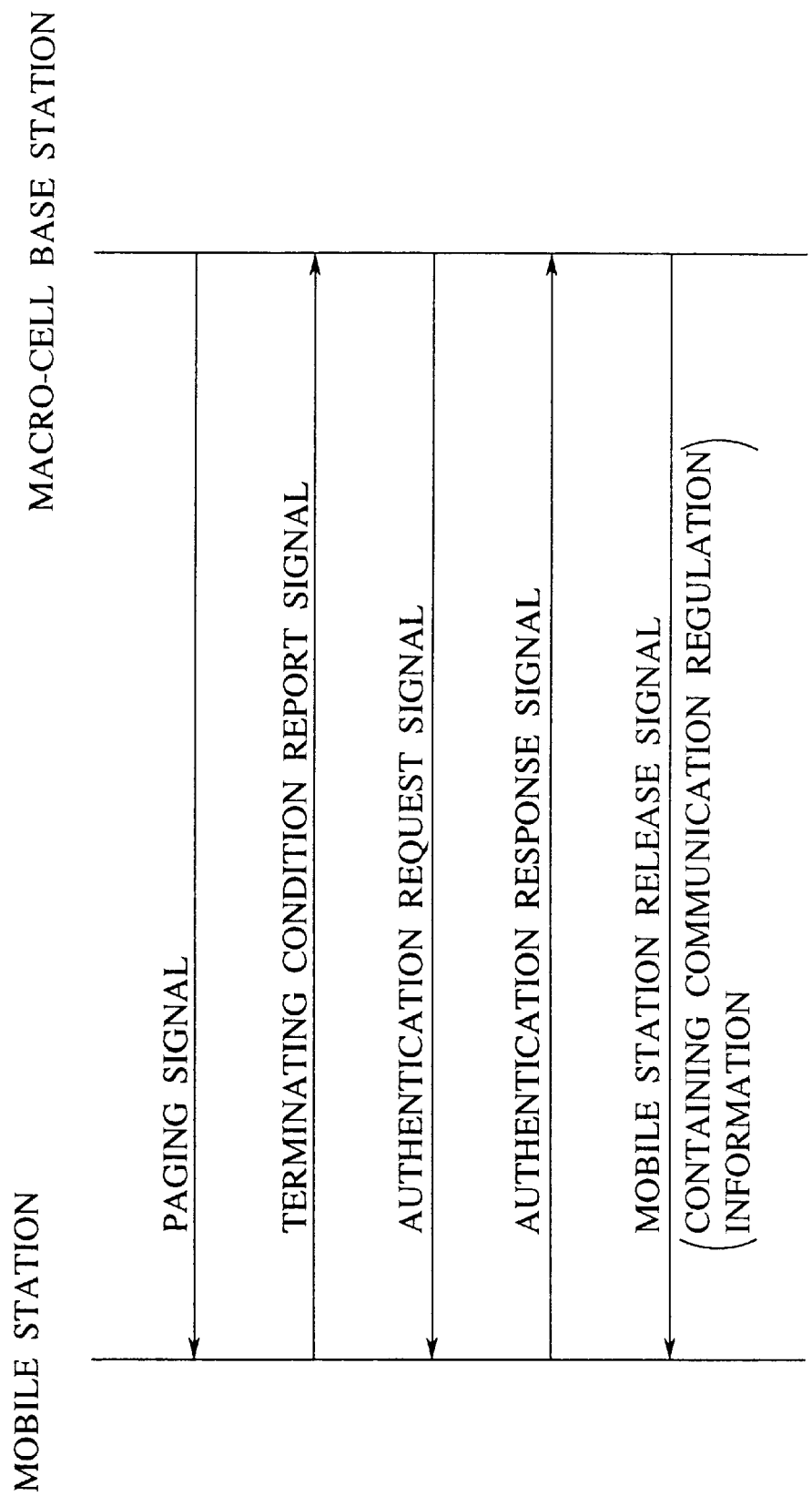

FIG.7

MESSAGE TYPE : MOBILE STATION RELEASE

DIRECTION : NETWORK → USER(SCCH)

| INFORMATION ELEMENT | DIRECTION | CLASS | INFORMATION LENGTH | CONTENT |
|---|---|---|---|---|
| MESSAGE TYPE | DOWNLINK | M | 1 | 00100001 |
| CAUSE | DOWNLINK | M | 1 | (NOTE) |

(NOTE) RT (RADIO TRANSMISSION CONTROL) CAUSE

BIT  8  7  6  5  4  3  2  1   CAUSE 0  0  0  1  1  0  0  1   : COMMUNICATION REGULATION PRESENT
                                       (TEMPORAL SERVICE PROHIBITION)

0  0  0  1  1  1  1  0   : COMMUNICATION REGULATION PRESENT
                                       (PERMANENT SERVICE PROHIBITION)

OTHERS   : COMMUNICATION REGULATION ABSENT
                          (REGULATION REMOVED)

FIG.10

MESSAGE TYPE : MICRO-CELL LOCATION REGISTRATION REQUEST
DIRECTION : USER ⟶ NETWORK(SCCH)

| INFORMATION ELEMENT | DIRECTION | CLASS | INFORMATION LENGTH | CONTENT |
|---|---|---|---|---|
| MESSAGE TYPE | UPLINK | M | 1 | 10000001 |
| SUBSCRIBER NO. | UPLINK | M | 1~14 | |
| COMMUNICATION REGULATION INFORMATION REPORT | UPLINK | O | 1 | (NOTE) |

(NOTE) REGULATION INFORMATION INDICATION

BIT  8 7 6 5 4 3 2 1    REGULATION INFORMATION VALUE 0 0 0 0 0 0 1 0 : COMMUNICATION REGULATION PRESENT
                     (TEMPORAL SERVICE PROHIBITION)

0 0 0 0 0 0 1 1 : COMMUNICATION REGULATION PRESENT
                     (PERMANENT SERVICE PROHIBITION)

OTHERS : COMMUNICATION REGULATION ABSENT
                    (REGULATION REMOVED)

MOBILE COMMUNICATION SCHEME FOR EFFICIENTLY REGULATING SERVICE THROUGH MICRO-CELL SYSTEM IN COORDINATION WITH SERVICE THROUGH MACRO-CELL SYSTEM

BACKGROUND OF THE INVENTION

1. Field of the Invention

The present invention relates to a mobile communication scheme using a macro-cell system formed by a mobile communication network and macro-cell base stations connected to the mobile communication network and a micro-cell system formed by micro-cell base stations and a control device for controlling plural micro-cell base stations which are connected with the mobile communication network through a publictelecommunications network, and more particularly, to a mobile communication scheme for regulating the service through the micro-cell system efficiently in coordination with the regulation of the service through the macro-cell system, with respect to a mobile station which is no longer permitted to use the cellular system because of a contract cancellation or a service suspension due to arrears of service charges or some other cause.

2. Description of the Background Art

In the mobile communication system using the macro-cell system and the micro-cell system, when the use of the cellular system is no longer permitted to a certain mobile station because of a contract cancellation or a service suspension due to arrears of service charges, for example, there is a need to coordinate the prohibition of service through the micro-cell system with the prohibition of service through the macro-cell system, because the micro-cell system should be viewed as an extension of the macro-cell system.

In the micro-cell system, the micro-cell base stations and the control device for controlling plural micro-cell base stations are connected to a fixed telephone network, and this fixed telephone network is further connected to the mobile communication network of the macro-cell system, so that in order to notify the prohibition/permission of service with respect to a certain mobile station from the macro-cell system to the micro-cell system, it is necessary to carry out a communication using a public communication channel of the fixed telephone network.

However, in order to carry out communications by modems using public communication channels of the fixed telephone network, it is necessary for the mobile communication network to have new interface devices which are different from those used for communications with the macro-cell base stations within the mobile communication network, so that there is a problem that enormous cost and time will be required in order to provide such new interface devices in the mobile communication network. Moreover, there is a need to carry out communications with respect to different micro-cell systems separately, so that there is also a problem that enormous cost and time for communications will be required in addition.

SUMMARY OF THE INVENTION

It is therefore an object of the present invention to provide a mobile communication scheme capable of notifying a communication regulation information efficiently by using a radio interface from the macro-cell system to the micro-cell system, without requiring communications through a fixed communication network, so as to be able to regulate the service through the micro-cell system efficiently in coordination with the regulation of the service through the macro-cell system, with respect to a mobile station which is no longer permitted to use the cellular system because of a contract cancellation or a service suspension due to arrears of service charges or some other cause.

According to one aspect of the present invention there is provided a mobile communication system, comprising: at least one mobile station; a macro-cell system formed by a mobile communication network and macro-cell base stations connected to the mobile communication network; and a micro-cell system formed by micro-cell base stations and/or a control device for controlling plural micro-cell base stations which are connected with a fixed communication network; wherein the macro-cell system has a function for notifying a communication regulation information to the mobile station while the mobile station is located within the macro-cell system, the communication regulation information indicating a communication regulation with respect to the mobile station that is applied at the macro-cell system; the mobile station has a memory unit for storing the communication regulation information received from the macro-cell system, and a notification unit for notifying the communication regulation information stored in the memory unit to the micro-cell system while being located within the micro-cell system after moving from the macro-cell system to the micro-cell system; and the micro-cell system has a function for applying the communication regulation to the mobile station according to the communication regulation information received from the mobile station.

According to another aspect of the present invention there is provided a method for controlling a mobile communication system having at least one mobile station, a macro-cell system formed by a mobile communication network and macro-cell base stations connected to the mobile communication network, and a micro-cell system formed by micro-cell base stations and/or a control device for controlling plural micro-cell base stations which are connected with a fixed communication network, the method comprising the steps of: notifying a communication regulation information from the macro-cell system to the mobile station while the mobile station is located within the macro-cell system, the communication regulation information indicating a communication regulation with respect to the mobile station that is applied at the macro-cell system; storing the communication regulation information received from the macro-cell system at the mobile station; notifying the communication regulation information stored at the mobile station from the mobile station to the micro-cell system while the mobile station is located within the micro-cell system after moving from the macro-cell system to the micro-cell system; and applying the communication regulation to the mobile station at the micro-cell system according to the communication regulation information received from the mobile station.

According to another aspect of the present invention there is provided a mobile station device for use in a mobile communication system having at least one mobile station, a macro-cell system formed by a mobile communication network and macro-cell base stations connected to the mobile communication network, and a micro-cell system formed by micro-cell base stations and/or a control device for controlling plural micro-cell base stations which are connected with a fixed communication network, the mobile station device comprising: a memory unit for storing a communication regulation information notified from the macro-cell system while the mobile station device is located within the macro-cell system, the communication regulation information indicating a communication regulation with respect to the mobile station device that is applied at the macro-cell system; and a notification unit for notifying the communication regulation information stored in the memory unit to the micro-cell system while the mobile station device is located within the micro-cell system after moving from the macro-cell system to the micro-cell system, so that the micro-cell system applies the communication regulation to the mobile station device according to the communication regulation information notified from the mobile station device.

Other features and advantages of the present invention will become apparent from the following description taken in conjunction with the accompanying drawings.

BRIEF DESCRIPTION OF THE DRAWINGS

FIGS. 2A and 2B are schematic diagrams for explaining a concept of underlay used in one embodiment of the present invention.

FIG. 3 is a sequence chart for a location registration sequence between a mobile station and a macro-cell base station in the mobile communication system of FIG. 1.

FIG. 4 is a diagram showing an exemplary signal format for a location registration acknowledgement signal used in the location registration sequence of FIG. 3.

FIG. 5 is a diagram showing an exemplary signal format for a location registration reject signal used in the location registration sequence of FIG. 3.

FIG. 6 is a sequence chart for a call termination sequence between a mobile station and a macro-cell base station in the mobile communication system of FIG. 1.

FIG. 7 is a diagram showing an exemplary signal format for a mobile station release signal used in the call termination sequence of FIG. 6.

FIG. 10 is a diagram showing an exemplary signal format for a location registration request signal used in the location registration sequence of FIG. 3.

DETAILED DESCRIPTION OF THE PREFERRED EMBODIMENTS

Referring now to FIG. 1 to FIG. 14, one embodiment of a mobile communication scheme according to the present invention will be described in detail.

Figure 1:
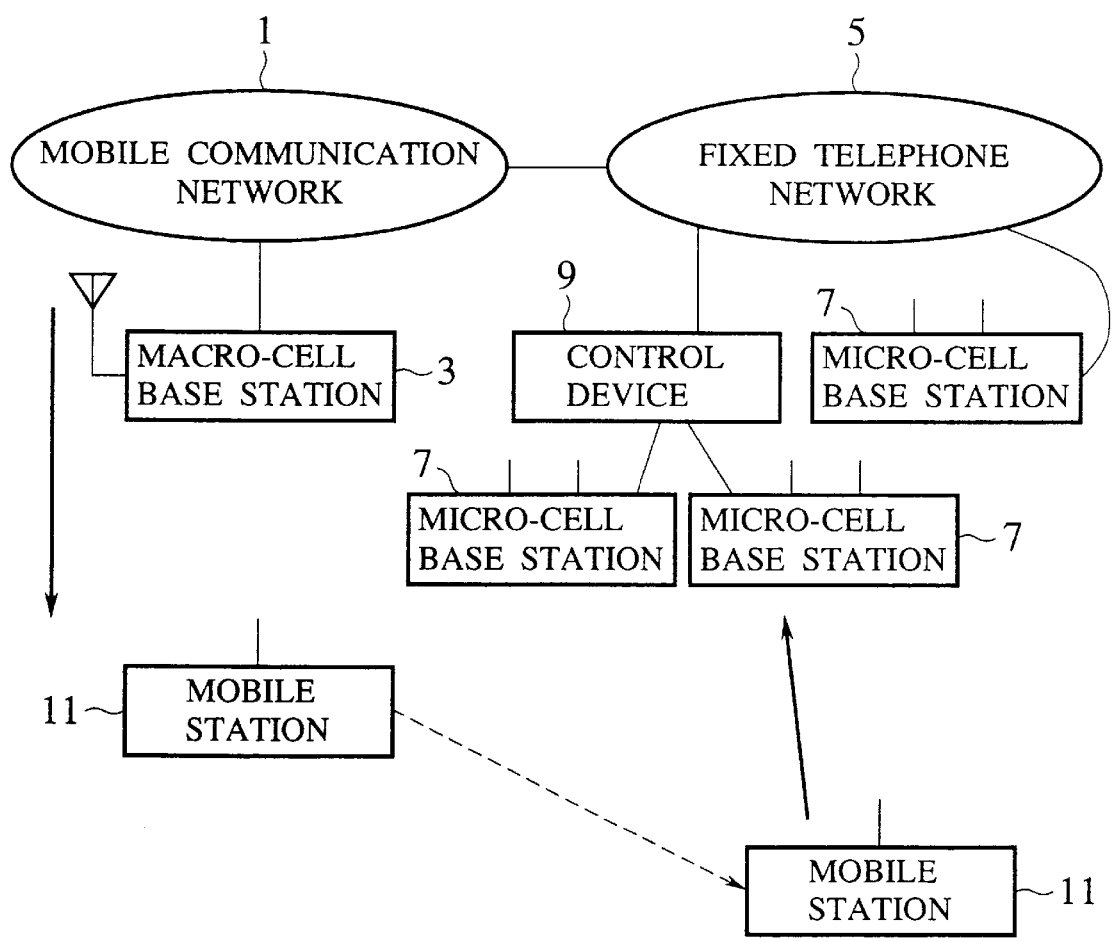
FIG. 1 is a schematic block diagram of a mobile communication system for realizing a mobile communication scheme according to one embodiment of the present invention.

In this embodiment, the mobile communication system has a configuration as shown in FIG. 1, which constitutes a digital mobile telephone system, for example. In this mobile communication system of FIG. 1, a macro-cell system is formed by macro-cell base stations 3 (only one macro-cell base station is shown in FIG. 1 for the sake of simplicity) connected to a mobile communication network 1, and a micro-cell system is formed by micro-cell base stations 7 and a control device 9 for controlling plural micro-cell base stations 7 which are connected to a fixed telephone network 5 that is a fixed communication network connected with the mobile communication network 1. Here, the macro-cell system is typically a public network system provided by a communication service provider, while the micro-cell system is typically a private network system owned by an individual user such as a personal home network system.

Also, in this embodiment, the micro-cell system is assumed to be arranged as an underlay with respect to the macro-cell system. Note that an exemplary case of arranging the micro-cell system as an underlay with respect to the macro-cell system will be described in this embodiment, but the present invention is not limited to such a case of arranging the micro-cell system as an underlay with respect to the macro-cell system, and the present invention is also applicable to a case of not using such an underlay arrangement.

Here, a concept of the underlay used in this embodiment will be explained in further detail with reference to FIGS. 2A and 2B. Namely, the underlay is an arrangement as shown in FIG. 2A in which a system B (corresponding to the micro-cell system) is arranged as a subsidiary of (i.e., within an area of) a system A (corresponding to the macro-cell system). In this case of FIG. 2A, the system B is said to be underlaying the system A. In contrast, in a case shown in FIG. 2B, the system B is not a subsidiary of the system A, so that the system B is not underlaying the system A. Note that, in a case shown in FIG. 2B, a system B' is partially arranged outside the area of the system A so that this system B' is also not underlaying the system A.

Note also that FIG. 1 depicts an exemplary situation in which a mobile station 11 which is located within the macro-cell system and communicating with the macro-cell base station 3 has moved to be located within the micro-cell system formed by the micro-cell base stations 7 and the control device 9 for controlling plural micro-cell base stations 7.

In the mobile communication system having a configuration as shown in FIG. 1, when the use of the cellular system is no longer permitted to the mobile station 11 because of a contract cancellation or a service suspension due to arrears of service charges, for example, a communication regulation information, that is an information on the prohibition of service with respect to this mobile station 11, should be promptly notified from the macro-cell system to the micro-cell system so as to coordinate the prohibition of service through the micro-cell system with the prohibition of service through the macro-cell system, because the micro-cell system should be viewed as an extension of the macro-cell system.

To this end, in the mobile communication system of this embodiment, when the above described situation of the prohibition of service with respect to the mobile station 11 arises, the micro-cell system generates the communication regulation information indicating the prohibition of service with respect to the mobile station 11, and notifies this communication regulation information to the mobile station 11 while the mobile station 11 is located within the macro-cell system.

This notification of the communication regulation information to the mobile station 11 can be realized by various procedures including the following procedures.

(1) The notification can be realized by adding the communication regulation information to a response signal with respect to a location registration request signal from the mobile station 11 to the macro-cell, such as a location registration acknowledgement signal or a location registration reject signal.

More specifically, the location registration sequence between the mobile station and the macro-cell base station can be carried out as shown in FIG. 3. In this location registration sequence of FIG. 3, while the mobile station is located within the macro-cell, a location registration request signal is sent from the mobile station to the macro-cell base station, then an authentication request signal is sent from the macro-cell base station to the mobile station, then an authentication response signal is sent from the mobile station to the macro-cell base station, and then either a location registration acknowledgement signal or a location registration reject signal is sent from the macro-cell base station to the mobile station, where the communication regulation information is set in the location registration acknowledgement signal or the location registration reject signal.

In a case of setting the communication regulation information in the location registration acknowledgement signal, the location registration acknowledgement signal can have a signal format as shown in FIG. 4 where an information element enclosed by the bold line is a newly provided information element, whereas in a case of setting the communication regulation information in the location registration reject signal, the location registration reject signal can have a signal format as shown in FIG. 5.

(2) The notification can be realized by sending the communication regulation information from the macro-cell system to the mobile station 11 after the location registration request from the mobile station 11 is processed, by means of a dummy call termination.

More specifically, the call termination sequence between the mobile station and the macro-cell base station can be carried out as shown in FIG. 6. In this call termination sequence of FIG. 6, a paging signal is sent from the macro-cell base station to the mobile station, then a terminating condition report signal is sent from the mobile station to the macro-cell base station, then an authentication request signal is sent from the macro-cell base station to the mobile station, then an authentication response signal is sent from the mobile station to the macro-cell base station, and then a mobile station release signal is sent from the macro-cell base station to the mobile station, where the communication regulation information is set in the mobile station release signal.

In a case of setting the communication regulation information in the mobile station release signal, the mobile station release signal can have a signal format as shown in FIG. 7.

(3) The notification can be realized by defining the communication regulation information within a signal for notifying the rejection of the call origination request from the mobile station 11, such as a mobile station release signal for example.

Figure 8:
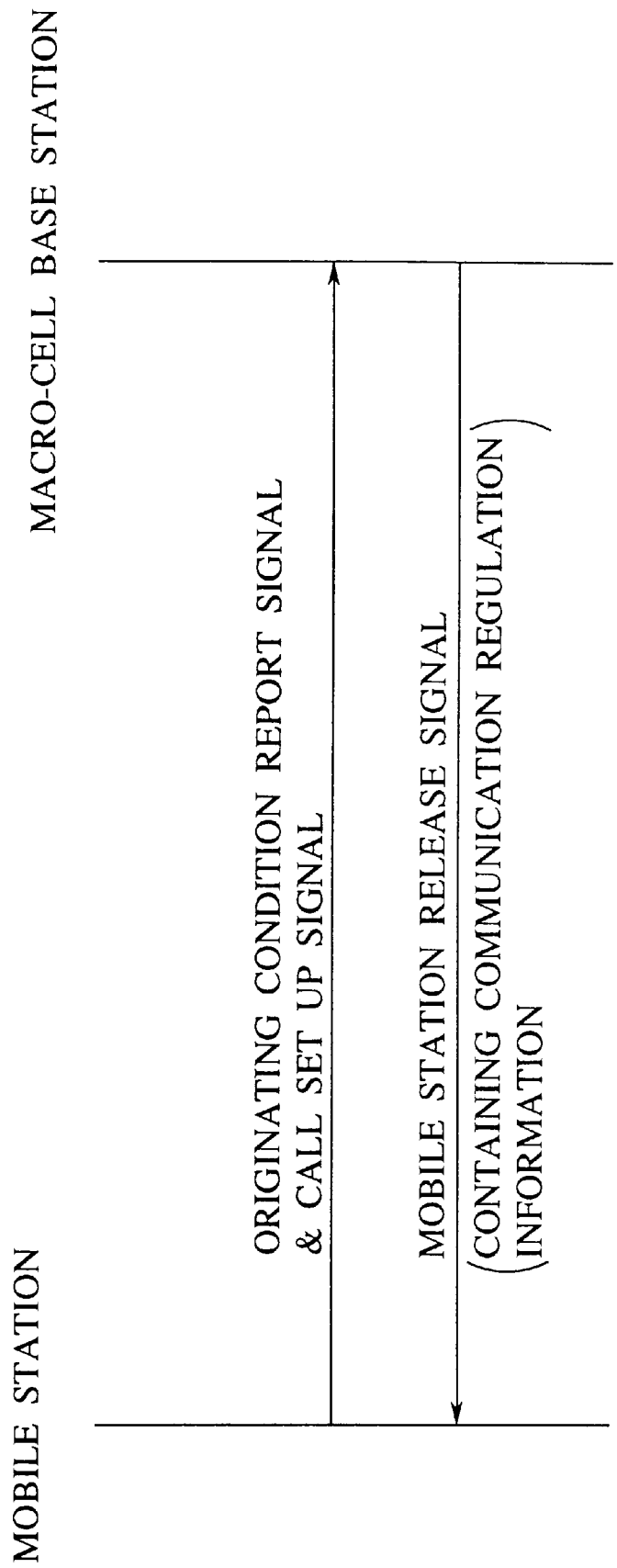
FIG. 8 is a sequence chart for a call origination sequence between a mobile station and a macro-cell base station in the mobile communication system of FIG. 1.

More specifically, the call origination sequence between the mobile station and the macro-cell base station can be carried out as shown in FIG. 8. In this call origination sequence of FIG. 8, an originating condition report signal and a call set up signal are sent from the mobile station to the macro-cell base station, and then a mobile station release signal is sent from the macro-cell base station to the mobile station, where the communication regulation information is set in the mobile station release signal.

In this case, the mobile station release signal can have the same signal format as that shown in FIG. 7.

(4) The notification can be realized sending the communication regulation information from the macro-cell system to the mobile station 11 by means of a dummy call termination when the cellular system provider applies the communication regulation with respect to the mobile station 11. In this case, there is a possibility that the mobile station 11 cannot receive this notification signal, so that the macro-cell system judges whether there is a response from the mobile station 11 or not, and when there is no response from the mobile station 11, the macro-cell system either regularly repeats the dummy call termination, or defers the notification until the mobile station 11 comes to be located within the macro-cell system and realizes the notification by any of the procedures (1) to (3) described above while the mobile station 11 is located within the macro-cell system.

In accordance with the communication regulation information notified by any of the procedures described above, the mobile station 11 judges that this mobile station 11 is placed under the communication regulation, and that it is necessary to notify this communication regulation information to the micro-cell system when this mobile station 11 moves to the micro-cell system. Here, this judgement can be made (1) upon receiving the communication regulation information at the mobile station 11 once, or (2) upon receiving the communication regulation information at the mobile station 11 for a prescribed number of times, for example. In the latter case, when it is recognized that the communication regulation is removed in a course of receiving the communication regulation information for a prescribed number of times, a number of times for receiving the communication regulation information can be cleared to 0.

On the other hand, the notification of the communication regulation information from the mobile station 11 to the micro-cell system can be realized by various procedures including the following procedures.

(1) The notification can be realized by adding the communication regulation information to a location registration request signal used in the location registration sequence.

Figure 9:
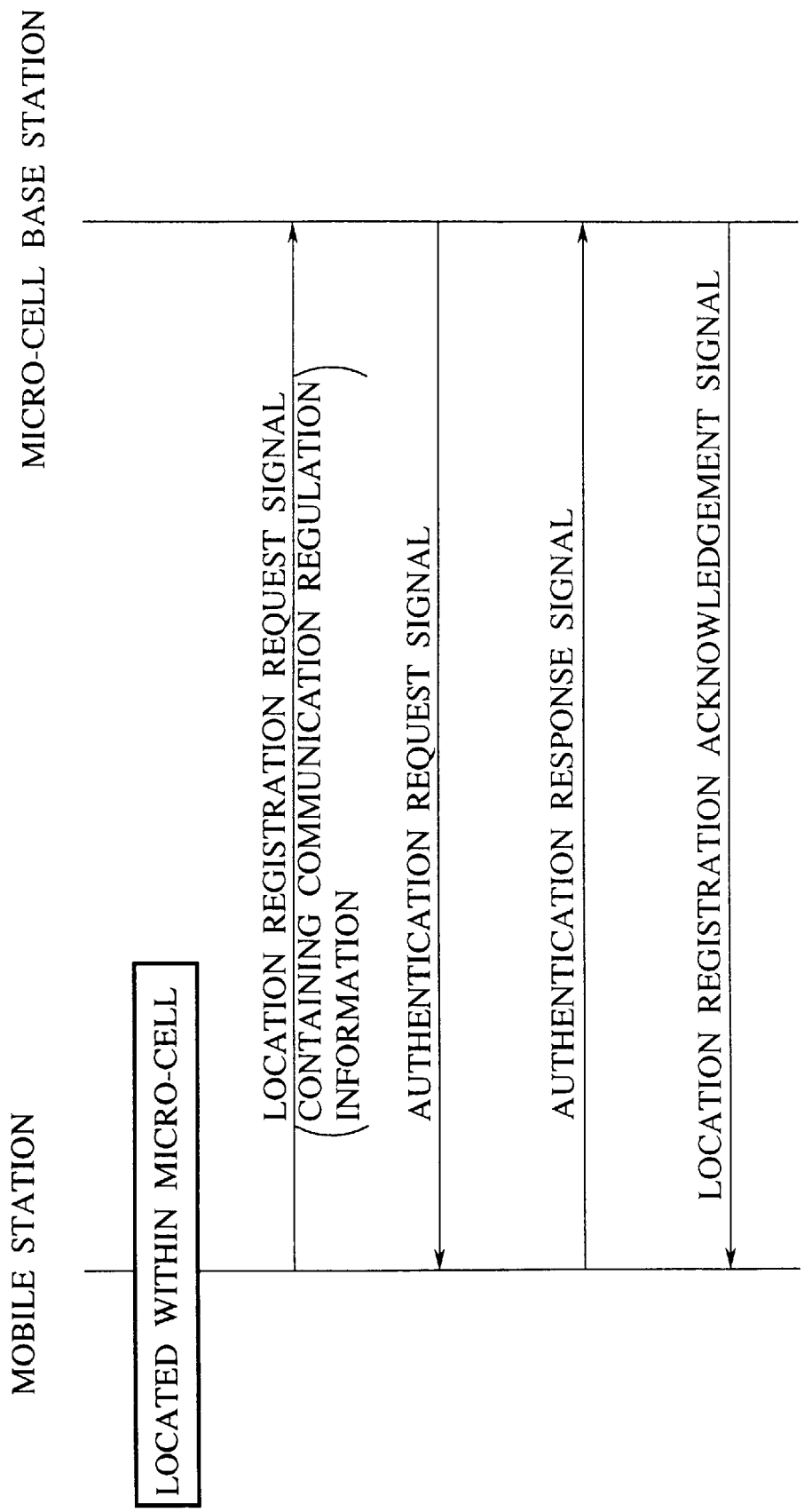
FIG. 9 is a sequence chart for a location registration sequence between a mobile station and a micro-cell base station in the mobile communication system of FIG. 1.

More specifically, the location registration sequence between the mobile station and the micro-cell base station can be carried out as shown in FIG. 9. In this location registration sequence of FIG. 9, while the mobile station is located within the micro-cell, a location registration request signal is sent from the mobile station to the micro-cell base station, then an authentication request signal is sent from the micro-cell base station to the mobile station, then an authentication response signal is sent from the mobile station to the micro-cell base station, and then a location registration acknowledgement signal is sent from the micro-cell base station to the mobile station, where the communication regulation information is set in the location registration request signal.

In a case of setting the communication regulation information in the location registration request signal, the location registration request signal can have a signal format as shown in FIG. 10 where information elements enclosed by the bold line are newly provided information elements.

(2) The notification can be realized by originating a call to a prescribed special telephone number defined in advance for the purpose of notifying the communication regulation information as already available in the conventional mobile communication system, after the mobile station 11 has come to be located within the micro-cell.

As for the detection of the communication regulation at the micro-cell system to which the mobile communication information is notified from the mobile station 11, the the communication regulation can be detected (1) upon receiving the communication regulation information once, or (2) upon receiving the communication regulation information for a prescribed number of times, for example. In the latter case, when it is recognized that the communication regulation is removed in a course of receiving the communication regulation information for a prescribed number of times, a number of times for receiving the communication regulation information can be cleared to 0.

When the communication regulated state of the mobile station 11 is detected, the micro-cell system applies the communication regulation with respect to this mobile station 11 within its own area.

As for the communication regulation to be applied with respect to the mobile station 11, (1) the locating the mobile station 11 within an area of the system is prohibited, or (2) the locating the mobile station 11 within an area of the system is permitted but the call origination and termination for the mobile station 11 are prohibited, for example. Any suitable type of communication regulation to be applied can be set by the service provider.

Next, with reference to the flow chart of FIG. 11, the communication regulation processing in the mobile communication system of this embodiment will be described.

Figure 11:
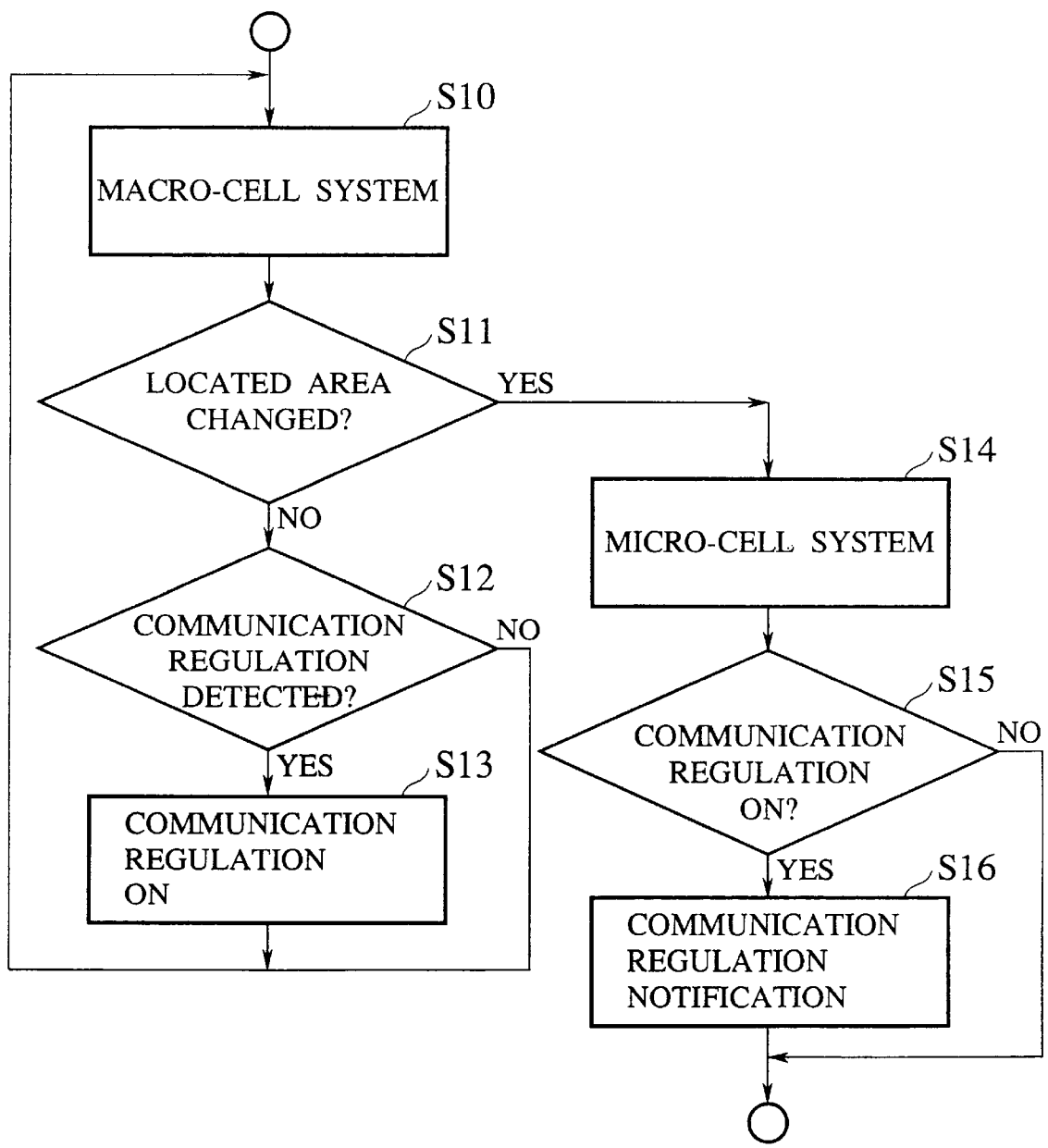
FIG. 11 is a flow chart for a communication regulation processing in the mobile communication system of FIG. 1.

In FIG. 11, the mobile station 11 is originally located within the macro-cell system (step S10), and whether this mobile station 11 has moved to the micro-cell system or not is checked (step S11). When the mobile station 11 has not moved to the micro-cell system, whether there is a communication regulation with respect to this mobile station 11 or not is detected (step S12). When there is a communication regulation, the communication regulation information is notified to this mobile station 11 by any of the procedures described above, and the communication regulation is turned ON (step S13). Then, the processing returns to the step S10.

On the other hand, when the mobile station 11 has moved to change the located area to the micro-cell system at the step S11, the mobile station 11 moves to be located within the micro-cell system (step S14), and whether this mobile station 11 is in the communication regulated state or not is checked (step S15). When this mobile station 11 is in the communication regulated state, the communication regulation information is notified from this mobile station 11 to the micro-cell system by any of the procedures described above (step S16), so that the communication is applied to this mobile station 11.

Figure 12:
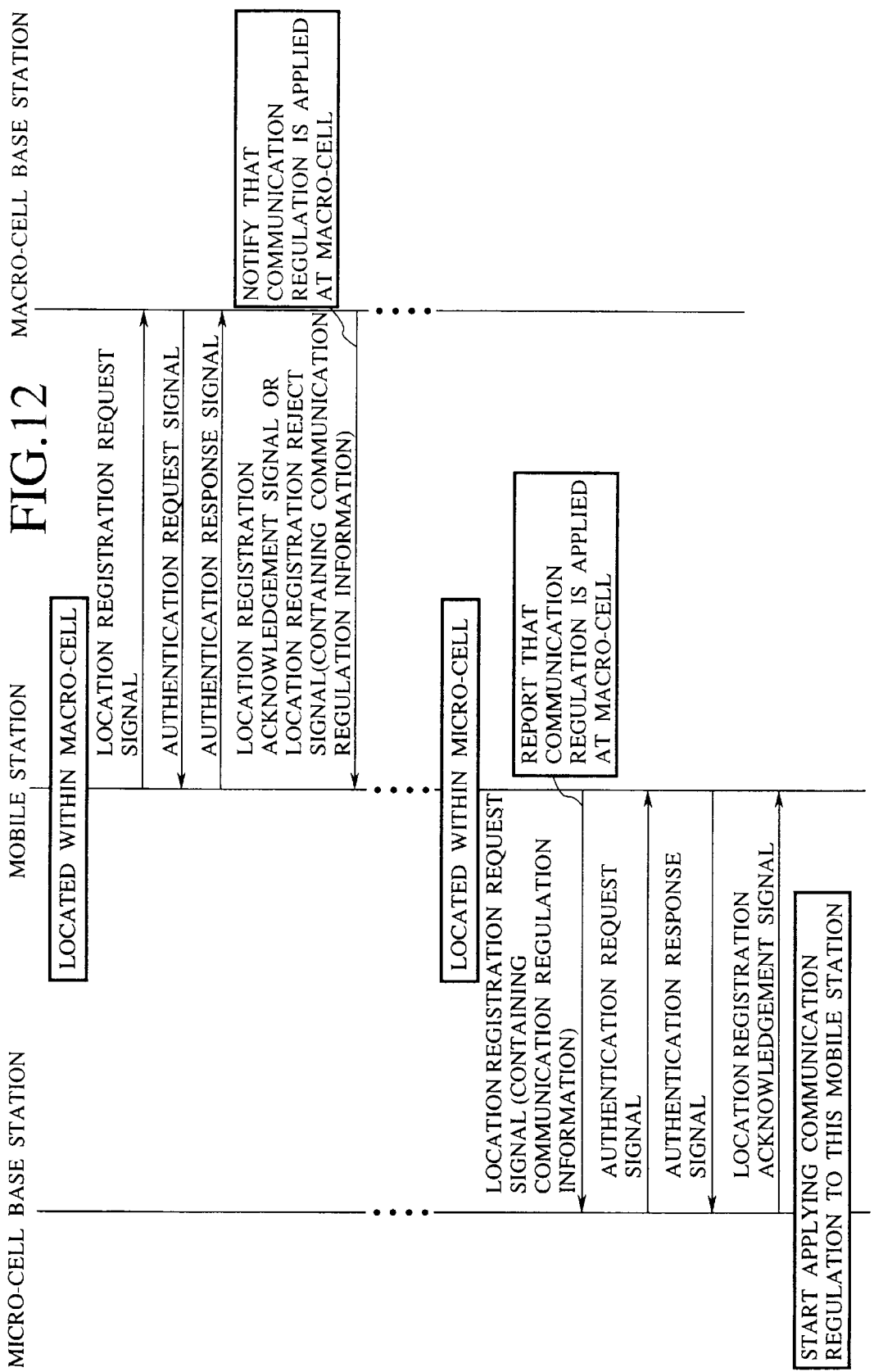
FIG. 12 is a sequence chart for a mobile station initiated type radio section signal sequence that can be used in the communication regulation processing of FIG. 11.

In further detail, this communication regulation processing in the mobile communication system of this embodiment can be realized according to the radio section signal sequence as shown in FIG. 12 (a mobile station initiated type) or FIG. 13 (a base station initiated type) as follows.

In the mobile station initiated type radio section signal sequence of FIG. 12, while the mobile station is located within the macro-cell, a location registration request signal is sent from the mobile station to the macro-cell base station, then an authentication request signal is sent from the macro-cell base station to the mobile station, then an authentication response signal is sent from the mobile station to the macro-cell base station, and then either a location registration acknowledgement signal or a location registration reject signal that contains the communication regulation information is sent from the macro-cell base station to the mobile station so as to notify the fact that the communication regulation is applied at the macro-cell.

Subsequently, while the mobile station is located within the micro-cell, a location registration request signal that contains the communication regulation information is sent from the mobile station to the micro-cell base station so as to report the fact that the communication regulation is applied at the macro-cell, then an authentication request signal is sent from the micro-cell base station to the mobile station, then an authentication response signal is sent from the mobile station to the micro-cell base station, and then a location registration acknowledgement signal is sent from the micro-cell base station to the mobile station. In response, the micro-cell base station starts to apply the communication regulation with respect to this mobile station.

Figure 13:
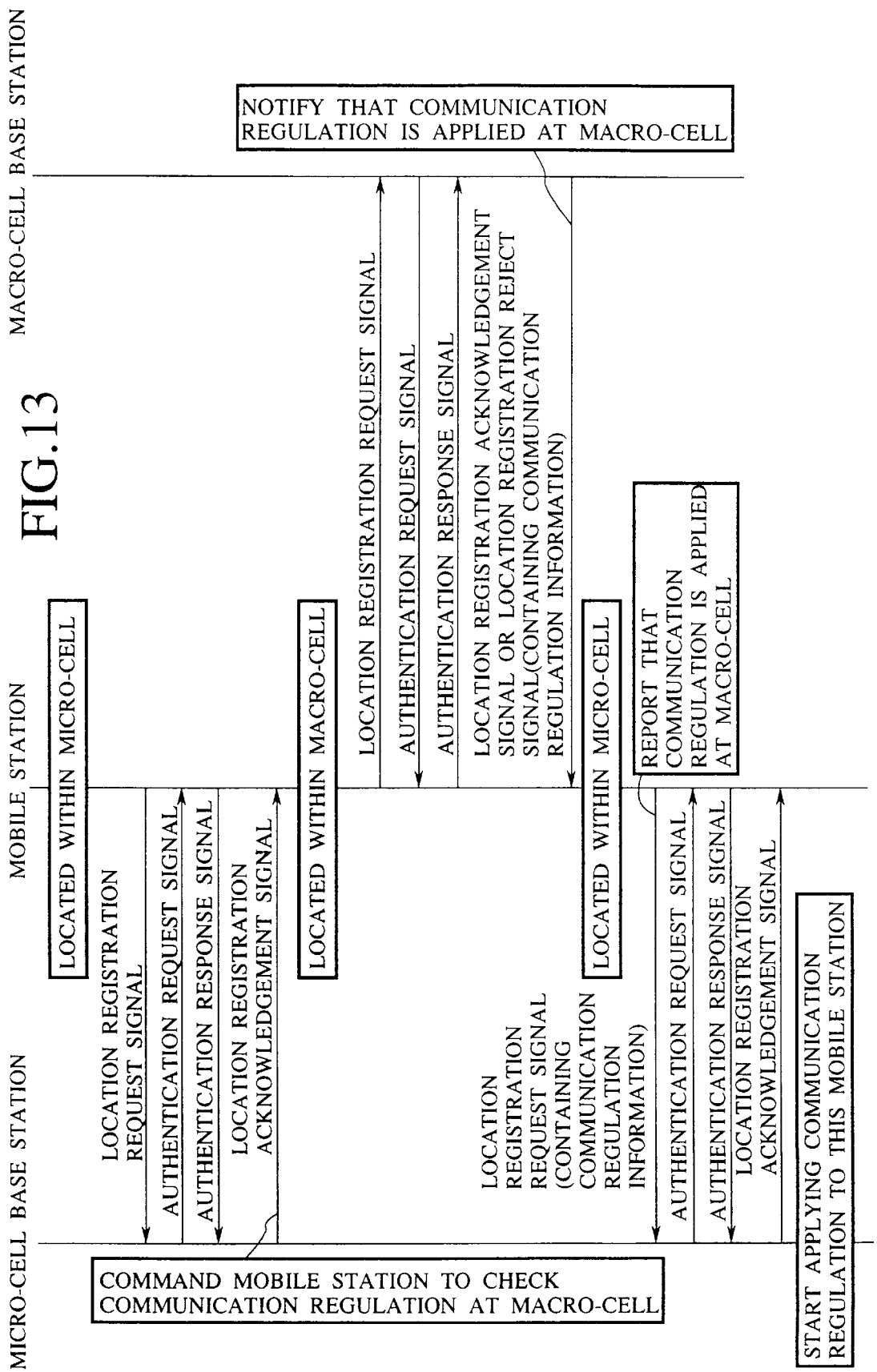
FIG. 13 is a sequence chart for a base station initiated type radio section signal sequence that can be used in the communication regulation processing of FIG. 11.

In the base station initiated type radio section signal sequence of FIG. 13, while the mobile station is located within the micro-cell, a location registration request signal is sent from the mobile station to the micro-cell base station, then an authentication request signal is sent from the micro-cell base station to the mobile station, then an authentication response signal is sent from the mobile station to the micro-cell base station, and then a location registration acknowledgement signal is sent from the micro-cell base station to the mobile station where this location registration acknowledgement signal also commands the mobile station to check the communication regulation at the macro-cell.

Subsequently, while the mobile station is located within the macro-cell, a location registration request signal is sent from the mobile station to the macro-cell base station, then an authentication request signal is sent from the macro-cell base station to the mobile station, then an authentication response signal is sent from the mobile station to the macro-cell base station, and then either a location registration acknowledgement signal or a location registration reject signal that contains the communication regulation information is sent from the macro-cell base station to the mobile station so as to notify the fact that the communication regulation is applied at the macro-cell.

Subsequently, while the mobile station is located within the micro-cell, a location registration request signal that contains the communication regulation information is sent from the mobile station to the micro-cell base station so as to report the fact that the communication regulation is applied at the macro-cell, then an authentication request signal is sent from the micro-cell base station to the mobile station, then an authentication response signal is sent from the mobile station to the micro-cell base station, and then a location registration acknowledgement signal is sent from the micro-cell base station to the mobile station. In response, the micro-cell base station starts to apply the communication regulation with respect to this mobile station.

Figure 14:
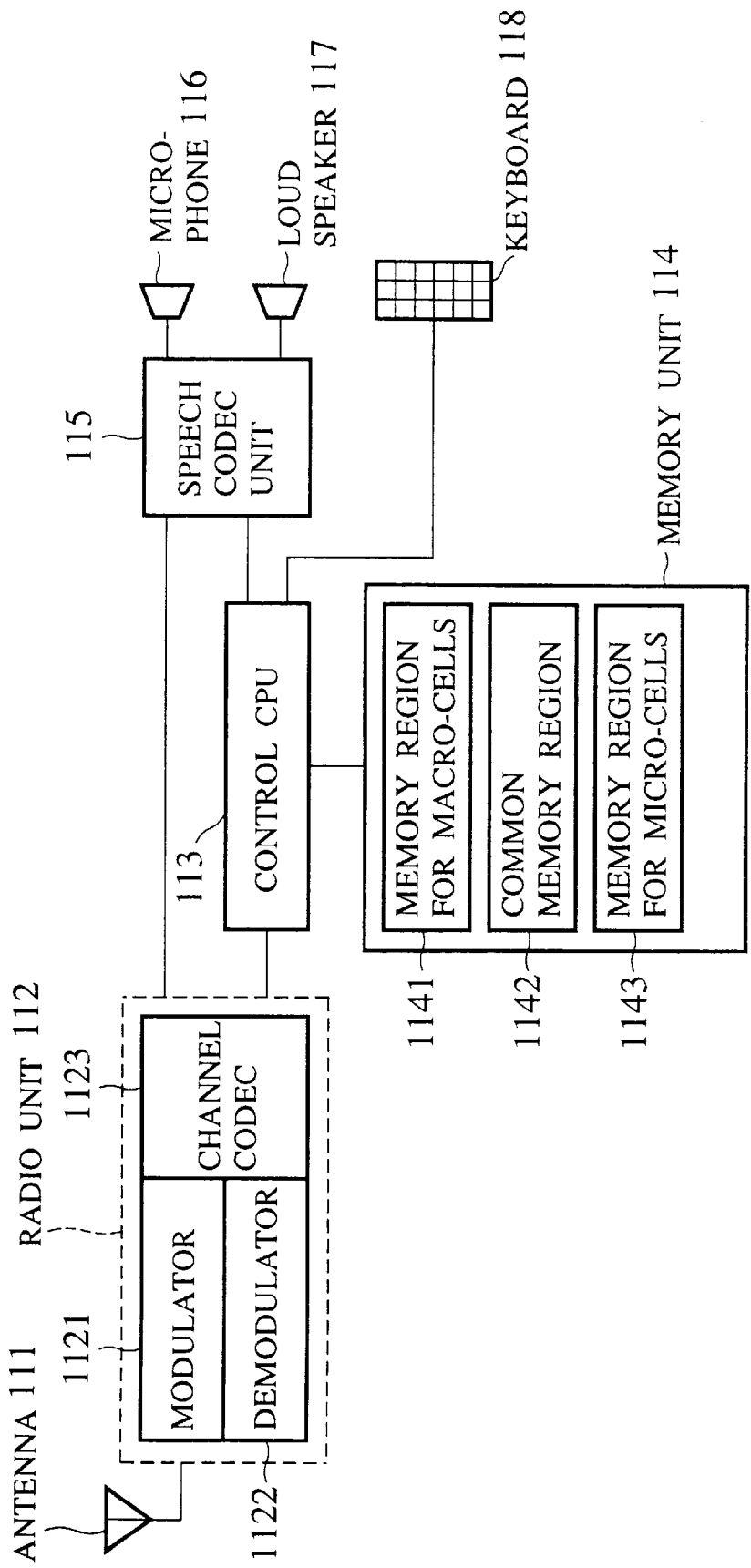
FIG. 14 is a block diagram of an internal configuration of a mobile station in the mobile communication system of FIG. 1.

In order to carry out the above described communication regulation processing, the mobile station in the mobile communication system of this embodiment has an internal configuration as shown in FIG. 14, which comprises an antenna 111, a radio unit 112 connected with the antenna 111, a control CPU 113 connected with the radio unit 112, a memory 114 connected with the control CPU 113, a speech codec unit 115 connected with the radio unit 112 and the control CPU 113, a microphone 116 and a loudspeaker 117 connected with the speech codec unit 115, and a keyboard 118 connected with the control CPU 113. The radio unit 112 contains a modulator 1121, a demodulator 1122, and a channel codec 1123.

Also, in this mobile station of FIG. 14, the memory 114 contains a dedicated memory region 1141 for macro-cells, a common memory region 1142 for both macro-cells and micro-cells, and a dedicated memory region 1143 for micro-cells. The memory region 1141 for macro-cells stores parameters necessary in the macro-cell operations, while the memory region 1143 for micro-cells stores parameters necessary in the micro-cell operations. The common memory region 1142 stores the communication regulation information used in the present invention.

While operating in the macro-cell, in a case of the normal call origination or termination operation, the mobile station carries out the operation by using the parameters stored in the memory region 1141 for macro-cells under the control of the control CPU 113. Then, while operating in the macro-cell, when the communication regulation information is received from the macro-cell base station, the mobile station stores this communication regulation information in the common memory region 1142 under the control of the control CPU 113.

Subsequently, when the mobile station moved to be located within the micro-cell, the mobile station reads out the communication regulation information stored in the common memory region 1142, and notifies it to the micro-cell base station under the control of the control CPU 113.

The above described communication regulation information can be defined in one type or more than one types. For example, more than one types of communication regulation information can be defined depending on regulation contents, such as a temporal service prohibition information indicating the service suspension and a permanent service prohibition information indicating the contract cancellation which are two types of communication regulation information to be used in this embodiment. In this manner, more than one types of communication regulated state at the micro-cell system can be set up. In order to define two types of communication regulation information, two bits signal region can be provided and two types of communication regulation information can be defined as follows, for example.

11—communication regulation present (permanent service prohibition)
    10—communication regulation present (temporal service prohibition)
    00—communication regulation absent When two types of communication regulation information are defined as such, each processing described above such as a recognition of the communication regulation at the mobile station, a notification of the communication regulation information from the mobile station to the micro-cell system, and a recognition of the communication regulation at the micro-cell system, should be carried out differently for each communication regulated state, because the communication regulation removal or the temporal communication regulation removal may be required subsequently in a case of the temporal service prohibition but not in a case of the permanent service prohibition.

Next, a notification of a regulation removal to the mobile station for the purpose of removing the communication regulation applied as described above will be described.

In a case of notifying the communication regulation removal, there is a need to define a signal that indicates "communication regulation absent". When a signal is to be used to indicate two types of information "communication regulation present" and "communication regulation absent", one bit signal region can be provided and two types of information can be defined as follows.

1—communication regulation present
    0—communication regulation absent When a signal is to be used to indicate three types of information "permanent service prohibition", "temporal service prohibition" and "communication regulation absent", two bits signal region can be provided and two types of communication regulation information can be defined as follows.

11—communication regulation present (permanent service prohibition)
    10—communication regulation present (temporal service prohibition)
    00—communication regulation absent The notification of the communication regulation removal by sending the communication regulation removal signal can be realized by the similar procedure as any of the procedures for notifying the communication regulation information including the following procedures.

(1) The notification can be realized by adding the communication regulation removal signal to a response signal with respect to a location registration request signal from the mobile station to the macro-cell, such as a location registration acknowledgement signal or a location registration reject signal.

(2) The notification can be realized by sending the communication regulation removal signal from the macro-cell system to the mobile station after the location registration request from the mobile station is processed, by means of a dummy call termination.

(3) The notification can be realized by defining the communication regulation removal signal within a signal for notifying the admission of the call origination request from the mobile station.

(4) The notification can be realized sending the communication regulation removal signal from the macro-cell system to the mobile station by means of a dummy call termination when the cellular system provider removes the communication regulation with respect to the mobile station. In this case, there is a possibility that the mobile station cannot receive this notification signal, so that the macro-cell system judges whether there is a response from the mobile station or not, and when there is no response from the mobile station, the macro-cell system either regularly repeats the dummy call termination, or defers the notification until the mobile station comes to be located within the macro-cell system and realizes the notification by any of the procedures (1) to (3) described above while the mobile station is located within the macro-cell system.

Note that the communication regulation removal signal is normally sent by the same procedure as that used for notifying the communication regulation information, but it is also possible to use different procedures for a notification of the communication regulation information and a notification of the communication regulation removal, and any suitable combination of notification procedures can be adopted by the service provider.

On the other hand, the notification of the communication regulation removal from the mobile station to the micro-cell system can be realized by various procedures including the following procedures.

(1) The notification can be realized by adding the communication regulation removal signal to a location registration request signal used in the location registration sequence.

(2) The notification can be realized by originating a call to a prescribed special telephone number defined in advance for the purpose of notifying the communication regulation removal, after the mobile station has come to be located within the micro-cell.

In addition, the detection of the communication regulation removal can be realized by recognizing the communication regulation removal when the mobile station cannot receive or detect the communication regulation information.

Such a method for detecting the communication regulation removal by non-reception of the communication regulation information is applicable when the procedure for notifying the communication regulation information to the mobile station is the above described procedure (2) in which the notification can be realized by sending the communication regulation information from the macro-cell system to the mobile station after the location registration request from the mobile station is processed, by means of a dummy call termination, or the above described procedure (4) in which the notification can be realized sending the communication regulation information from the macro-cell system to the mobile station by means of a dummy call termination when the cellular system provider applies the communication regulation with respect to the mobile station, where there is a possibility that the mobile station cannot receive this notification signal, so that the macro-cell system judges whether there is a response from the mobile station or not, and when there is no response from the mobile station, the macro-cell system either regularly repeats the dummy call termination, or carries out the dummy call termination after the mobile station has come to be located within the macro-cell system, for example.

In other words, this communication regulation removal detection method is applicable when the procedure for notifying the communication regulation information to the mobile station is a procedure in which the communication regulation information is to be notified to the mobile station by some notification processing and the mobile station is to be able to receive that communication regulation information, so that the mobile station can comprehend the reception timing of the communication regulation information. In such a case, it is possible to judge the communication regulation removal when the mobile station cannot receive the communication regulation information at that reception timing. Also, in such a case, it is possible to make a suitable setting as to whether the communication regulation removal is to be judged by the non-reception once, or by the consecutive non-reception for a plurality of times.

Also, the detection of the communication regulation removal can be realized by recognizing that the mobile station can operate normally within the macro-cell system. Namely, when the communication regulation with respect to the mobile station is removed, it becomes possible for the mobile station to receive the service within the macro-cell system again. Consequently, the mobile station can judge that the communication regulation with respect to itself has been removed by recognizing that (1) the location registration operation, (2) the call origination operation, or (3) the call termination operation can be carried out normally within the macro-cell system. Which one of these (1) to (3) is to be used as the timing for detecting the communication regulation removal is an optional design matter of the service provider. For example, it is possible to judge the communication regulation removal (1) when the location registration is acknowledged normally, or (2) when the control sequence of the call origination operation is completed and the transition to the communication state is made, or else (3) when the call termination signal (paging signal) is received.

In a case where it is desired to remove the communication regulation temporarily within the micro-cell system before the mobile station returns to the macro-cell system and detects the communication regulation removal, the following procedure can be used. Namely, (1) the mobile station sends a temporal communication regulation removal request signal by originating a call to a prescribed special telephone number or by a prescribed command operation, and then (2) the micro-cell system which received this temporal communication regulation removal request signal removes the communication regulation with respect to the mobile station temporarily.

After the communication regulation is temporarily removed in this manner, the mobile station can move to the macro-cell system, and if the communication regulation has been formally removed there, the communication regulation removal can be detected by the above described communication regulation removal notification processing. After that, when the mobile station is located within the micro-cell system, the communication regulation removal is notified to the micro-cell system, so that the transition to a state of having the communication regulation formally removed can be made.

When the communication regulation removal notification from the mobile station cannot be received within a prescribed period of time, the micro-cell system can apply the communication regulation with respect to the mobile station again.

Also, a limitation (or a guarantee) on the temporal communication regulation removal operation can be set by any of the following methods, so as to prevent a user under the communication regulation from effectively carrying out a continuous communication during the communication regulation by repeating the temporal communication regulation removal operations consecutively.

(1) A method in which the input information is varied for different users by using a variable which is calculated from a code for identifying a mobile station or a micro-cell base station which is given by either the information regarding the mobile station or the information regarding the base station or both.

(2) A method in which a limitation on a number of times for which the temporal communication regulation removal can be made is set up in advance by the micro-cell system.

(3) A method in which the service provider manages the information regarding a parameter that is to be updated whenever the temporal communication regulation removal is exercised so that the input information in a case of exercising the temporal communication regulation removal is changed at every occasion to exercise the temporal communication regulation removal.

(4) A method consisting of any suitable combination of the above methods (1) to (3).

As a modified embodiment of a mobile communication scheme according to the present invention, it is possible to modify the above described embodiment as follows.

Namely, the micro-cell system is provided as a system for private service. Then, when the locating of a mobile station within an area of a system or the call origination and termination for a mobile station is regulated with respect to the mobile station which has an ownership of the micro-cell base stations or the control device for controlling plural micro-cell base stations of this micro-cell system, these micro-cell base stations or a group of plural micro-cell base stations controlled under that control device stop the radio transmission.

In this modified embodiment, it is necessary for the micro-cell system to have a management table for a group of mobile stations for which the locating of a mobile station within an area of this micro-cell system is permitted, and to be able to identify the mobile station which has an ownership of this micro-cell system. Then, regardless of the presence or absence of the communication regulation with respect to the other mobile station groups, when the communication regulation is applied to the mobile station which has an ownership of this micro-cell system, the micro-cell base stations or a group of plural micro-cell base stations controlled under the control device of this micro-cell system stop the radio transmission.

By this modified embodiment, in a system where a plurality of mobile stations are registered, it becomes possible to stop the service with respect to the entire system when a representative mobile station (a mobile station of a system owner) is subjected to the communication regulation, regardless of states of the other mobile stations.

As another modified embodiment of a mobile communication scheme according to the present invention, it is possible to modify the above described embodiment as follows.

Namely, the micro-cell system is provided as a system for private service. Then, when the locating of a mobile station within an area of a system or the call origination and termination for a mobile station is regulated with respect to all the mobile stations which are registered as being capable of receiving the service of this micro-cell system, the micro-cell base stations or a group of plural micro-cell base stations controlled under the control device of this micro-cell system stop the radio transmission.

In this another modified embodiment, it is necessary for the micro-cell system to have a management table for a group of mobile stations for which the locating of a mobile station within an area of this micro-cell system is permitted, but unlike the above described modified embodiment, there is no need for the micro-cell system to be able to identify the mobile station which has an ownership of this micro-cell system, and all the locating permitted mobile station groups are treated equally as far as the communication regulation is concerned. Then, when the communication regulation is applied to all the mobile stations of the locating permitted mobile station groups, the micro-cell base stations or a group of plural micro-cell base stations controlled under the control device of this micro-cell system stop the radio transmission.

By this another modified embodiment, in a system where a plurality of mobile stations are registered, it becomes possible to stop the service with respect to the entire system when all the mobile stations registered in this system are subjected to the communication regulations.

As described, according to the present invention, the macro-cell system notifies the communication regulation information to the mobile station, the mobile station receives that communication regulation information and notifies that communication regulation information to the micro-cell base stations while being located within an area of the micro-cell system, and the micro-cell system regulates the locating of the mobile station within its area or the call origination and terminal for the mobile station according to the communication regulation information received from the mobile station. Consequently, there is no need to provide new interface devices in the mobile communication network, so that there is no need to spend enormous cost and time for that purpose and there is no increase of cost and time for communications, and therefore it becomes possible to realize the communication regulation on the micro-cell system side in coordination with the communication regulation on the macro-cell system side, easily and economically.

Also, according to the present invention, when the macro-cell system removes the communication regulation, the mobile station recognizes the communication regulation removal and notifies it to the micro-cell base stations, and the micro-cell system removes the communication regulation on the locating of the mobile station within its area or the call origination and termination for the mobile station according to the communication regulation removal information received from the mobile station. Consequently, there is no need to provide new interface devices in the mobile communication network, and therefore it becomes possible to realize the communication regulation removal on the micro-cell system side in coordination with the communication regulation removal on the macro-cell system side, easily and economically.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile communication system, comprising:

at least one mobile station;

a macro-cell system formed by a mobile communication network and macro-cell base stations connected to the mobile communication network; and a micro-cell system formed by micro-cell base stations and/or a control device for controlling plural micro-cell base stations which are connected with a fixed communication network;

wherein the macro-cell system has a function for notifying a communication regulation information to the mobile station while the mobile station is located within the macro-cell system, the communication regulation information indicating a communication regulation with respect to the mobile station that is applied at the macro-cell system;

the mobile station has a memory unit for storing the communication regulation information received from the macro-cell system, and a notification unit for notifying the communication regulation information stored in the memory unit to the micro-cell system while being located within the micro-cell system after moving from the macro-cell system to the micro-cell system; and the micro-cell system has a function for applying the communication regulation to the mobile station according to the communication regulation information received from the mobile station.

2. The system of claim 1, wherein the communication regulation information contains either a temporal service prohibition information indicating a temporal service suspension with respect to the mobile station or a permanent service prohibition indicating a service contract cancellation with respect to the mobile station.

3. The system of claim 1, wherein the macro-cell system also has a function for notifying a removal of the communication regulation at the macro-cell system to the mobile station;

the mobile station also has a recognition unit for recognizing the removal of the communication regulation as notified from the macro-cell system, and the notification unit also notifies a communication regulation removal information to the micro-cell system when the recognition unit recognizes the removal of the communication regulation, the communication regulation removal information indicating a resuming of a service with respect to the mobile station at the macro-cell system; and micro-cell system also has a function for removing the communication regulation with respect to the mobile station according to the communication regulation removal information received from the mobile station.

4. The system of claim 3, wherein the macro-cell system notifies the removal of the communication regulation by stopping a notification of the communication regulation information to the mobile station; and the recognition unit recognizes the removal of the communication regulation upon detecting non-reception of the communication regulation information from the macro-cell system.

5. The system of claim 3, wherein the macro-cell system notifies the removal of the communication regulation by notifying the communication regulation removal information to the mobile station; and the recognition unit recognizes the removal of the communication regulation upon receiving the communication regulation removal information from the macro-cell system.

6. The system of claim 3, wherein the macro-cell system notifies the removal of the communication regulation by enabling the mobile station to carry out a normal operation within an area of the macro-cell system; and the recognition unit recognizes the removal of the communication regulation upon detecting that the mobile station is capable of carrying out the normal operation within the area of the macro-cell system.

7. The system of claim 1, wherein the mobile station also has a special signal transmission unit for transmitting a prescribed special signal for temporarily resuming a service with respect to the mobile station within the micro-cell system; and the micro-cell system also has a function for temporarily removing the communication regulation with respect to the mobile station upon receiving the special signal from the mobile station.

8. The system of claim 1, wherein the micro-cell system is provided for private service, and when the communication regulation is applied to one mobile station which has an ownership of the micro-cell base stations or the control device, the micro-cell system also has a function for stopping radio transmission from the micro-cell base stations or the plural micro-cell base stations controlled by the control device.

9. The system of claim 1, wherein the micro-cell system is provided for private service, and when the communication regulation is applied to all mobile stations which are registered as being capable of receiving service of the micro-cell system, the micro-cell system also has a function for stopping radio transmission from the micro-cell base stations or the plural micro-cell base stations controlled by the control device.

10. A method for controlling a mobile communication system having at least one mobile station, a macro-cell system formed by a mobile communication network and macro-cell base stations connected to the mobile communication network, and a micro-cell system formed by micro-cell base stations and/or a control device for controlling plural micro-cell base stations which are connected with a fixed communication network, the method comprising the steps of:

notifying a communication regulation information from the macro-cell system to the mobile station while the mobile station is located within the macro-cell system, the communication regulation information indicating a communication regulation with respect to the mobile station that is applied at the macro-cell system;

storing the communication regulation information received from the macro-cell system at the mobile station;

notifying the communication regulation information stored at the mobile station from the mobile station to the micro-cell system while the mobile station is located within the micro-cell system after moving from the macro-cell system to the micro-cell system; and applying the communication regulation to the mobile station at the micro-cell system according to the communication regulation information received from the mobile station.

11. The method of claim 10, wherein the communication regulation information contains either a temporal service prohibition information indicating a temporal service suspension with respect to the mobile station or a permanent service prohibition indicating a service contract cancellation with respect to the mobile station.

12. The method of claim 10, further comprising the steps of:

notifying a removal of the communication regulation at the macro-cell system from the macro-cell system to the mobile station;

recognizing the removal of the communication regulation as notified from the macro-cell system at the mobile station, and notifying a communication regulation removal information from the mobile station to the micro-cell system upon recognizing the removal of the communication regulation at the mobile station, the communication regulation removal information indicating a resuming of a service with respect to the mobile station at the macro-cell system; and removing the communication regulation with respect to the mobile station at the micro-cell system according to the communication regulation removal information received from the mobile station.

13. The method of claim 12, wherein the macro-cell system notifies the removal of the communication regulation by stopping a notification of the communication regulation information to the mobile station; and the mobile station recognizes the removal of the communication regulation upon detecting non-reception of the communication regulation information from the macro-cell system.

14. The method of claim 12, wherein the macro-cell system notifies the removal of the communication regulation by notifying the communication regulation removal information to the mobile station; and the mobile station recognizes the removal of the communication regulation upon receiving the communication regulation removal information from the macro-cell system.

15. The method of claim 12, wherein the macro-cell system notifies the removal of the communication regulation by enabling the mobile station to carry out a normal operation within an area of the macro-cell system; and the mobile station recognizes the removal of the communication regulation upon detecting that the mobile station is capable of carrying out the normal operation within the area of the macro-cell system.

16. The method of claim 10, further comprising the steps of:

transmitting from the mobile station a prescribed special signal for temporarily resuming a service with respect to the mobile station within the micro-cell system; and temporarily removing the communication regulation with respect to the mobile station at the micro-cell system upon receiving the special signal from the mobile station.

17. The method of claim 10, wherein the micro-cell system is provided for private service, and when the communication regulation is applied to one mobile station which has an ownership of the micro-cell base stations or the control device, the micro-cell system stops radio transmission from the micro-cell base stations or the plural micro-cell base stations controlled by the control device.

18. The method of claim 10, wherein the micro-cell system is provided for private service, and when the communication regulation is applied to all mobile stations which are registered as being capable of receiving service of the micro-cell system, the micro-cell system stops radio transmission from the micro-cell base stations or the plural micro-cell base stations controlled by the control device.

19. A mobile station device for use in a mobile communication system having at least one mobile station, a macro-cell system formed by a mobile communication network and macro-cell base stations connected to the mobile communication network, and a micro-cell system formed by micro-cell base stations and/or a control device for controlling plural micro-cell base stations which are connected with a fixed communication network, the mobile station device comprising:

a memory unit for storing a communication regulation information notified from the macro-cell system while the mobile station device is located within the macro-cell system, the communication regulation information indicating a communication regulation with respect to the mobile station device that is applied at the macro-cell system; and a notification unit for notifying the communication regulation information stored in the memory unit to the micro-cell system while the mobile station device is located within the micro-cell system after moving from the macro-cell system to the micro-cell system, so that the micro-cell system applies the communication regulation to the mobile station device according to the communication regulation information notified from the mobile station device.

20. The mobile station device of claim 19, further comprising:

a recognition unit for recognizing a removal of the communication regulation notified from the macro-cell system, wherein the notification unit also notifies a communication regulation removal information to the micro-cell system when the recognition unit recognizes the removal of the communication regulation, the communication regulation removal information indicating a resuming of a service with respect to the mobile station device at the macro-cell system, so that the micro-cell system removes the communication regulation with respect to the mobile station device according to the communication regulation removal information notified from the mobile station device.

21. The mobile station device of claim 20, wherein the macro-cell system notifies the removal of the communication regulation by stopping a notification of the communication regulation information to the mobile station device; and the recognition unit recognizes the removal of the communication regulation upon detecting non-reception of the communication regulation information from the macro-cell system.

22. The mobile station device of claim 20, wherein the macro-cell system notifies the removal of the communication regulation by notifying the communication regulation removal information to the mobile station device; and the recognition unit recognizes the removal of the communication regulation upon receiving the communication regulation removal information from the macro-cell system.

23. The mobile station device of claim 20, wherein the macro-cell system notifies the removal of the communication regulation by enabling the mobile station device to carry out a normal operation within an area of the macro-cell system; and the recognition unit recognizes the removal of the communication regulation upon detecting that the mobile station device is capable of carrying out the normal operation within the area of the macro-cell system.

24. The mobile station device of claim 19, further comprising:

a special signal transmission unit for transmitting a prescribed special signal for temporarily resuming a service with respect to the mobile station device within the micro-cell system, so that the micro-cell system temporarily removes the communication regulation with respect to the mobile station device upon receiving the special signal from the mobile station device.

* * * * *